Sept. 6, 1960  F. B. HUNTER  2,951,500
RELIEF VALVE
Filed Oct. 29, 1957
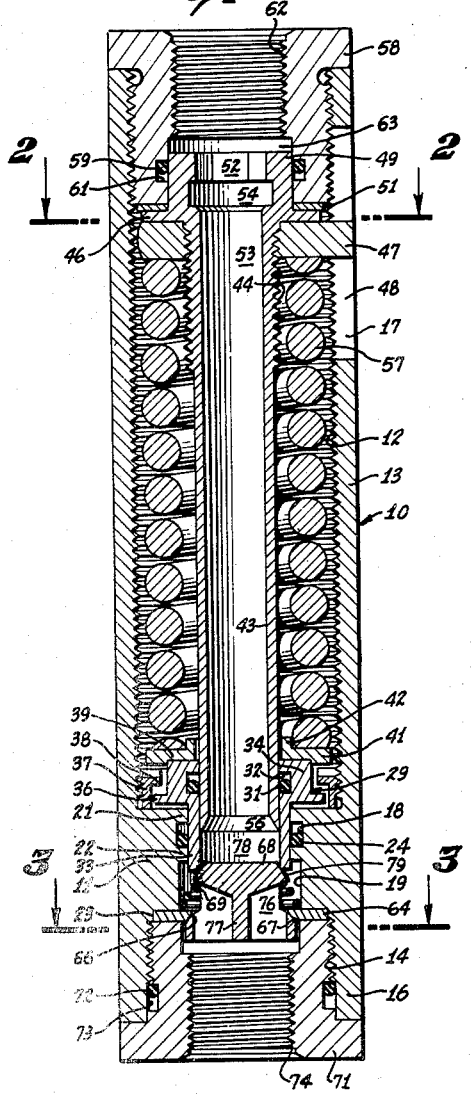
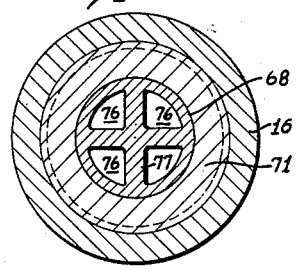
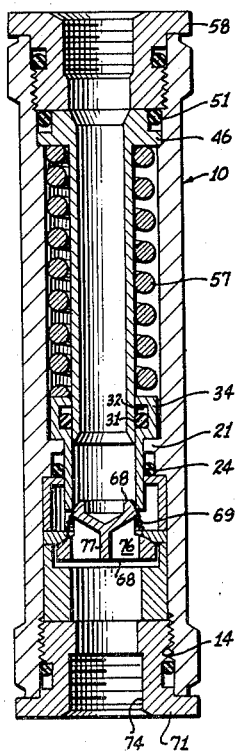
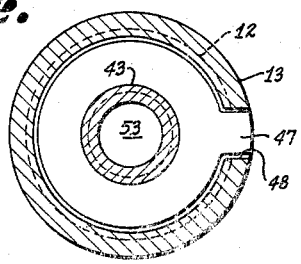
FRANK B. HUNTER,
INVENTOR.
HERZIG & JESSUP,
ATTORNEYS.
BY

United States Patent Office 2,951,500
Patented Sept. 6, 1960

2,951,500

RELIEF VALVE

Frank B. Hunter, Van Nuys, Calif.
(5667 Lubao St., Woodland Hills, Calif.)

Filed Oct. 29, 1957, Ser. No. 693,051

5 Claims. (Cl. 137—493.9)

The present invention relates to a hydraulic relief valve and particularly to an adjustable spring-loaded relief valve with counter flow features.

It is an important object of my invention to provide a hydraulic relief valve that is at the same time an adjustable in-line gage pressure unit.

Another object is to provide a relief valve wherein the valve element is fully self-aligning and can be opened by a predetermined back-pressure for counter flow.

A further object is to provide a safe adjustable relief valve with counter flow features designed to avoid hydraulic pressure release in the event of failure of the valve loading.

Additional objects will become apparent from the following description.

Broadly stated, my invention consists of a relief valve comprising a valve member provided with a surface of spherical curvature for seating in a seat member. The valve member is loosely mounted in the body of the valve assembly so that it can move laterally and self-align itself in the seat member. An elongated tube is mounted in an end of the body of the valve assembly to extend into the interior thereof. The seat member is slidably mounted about the inner end of the tube. Packing means and stop means preferably are associated with the seat member to frictionally damp the sliding movement thereof and to limit the distance over which the seat member can slide on the tube. A loaded spring is disposed around the tube to urge the seat member into engagement with the valve member in opposition to pressure from a hydraulic pressure system. Variable adjustment means preferably are associated with the spring for varying the loading thereof and the pressure on the seat member. A secondary spring, preferably of less load than the first mentioned spring, is disposed around the valve member to urge it into seating engagement with the seat member and to regulate counterflow from a relief system into the hydraulic pressure system.

A more detailed description of specific embodiments of the invention is given with reference to the drawing, wherein:

Figure 1 is a cross-sectional elevational view showing the relationship of the various elements of the valve assembly;

Figure 2 is a cross-sectional view taken on line 2—2 of Figure 1;

Figure 3 is a cross-sectional view taken on line 3—3 of Figure 1; and

Figure 4 is a view similar to that of Figure 1 of a different specific embodiment of the invention.

In the specific embodiment shown in Figures 1 to 3 of the drawing, a general tubular body 10 is formed with a constricted portion 11 nearer one end thereof than the other. An internal thread 12 is cut in the longer tubular portion 13 thus formed from the end thereof to the constricted portion 11. Commencing a short distance from the end thereof, an internal thread 14 is cut in the shorter tubular portion 16 to the constricted portion. The longer tubular portion 13 is preferably made of somewhat greater inside diameter than the shorter tubular portion 16. An elongated keyway or slot 17 is cut through the wall of the longer tubular portion 13 axially thereof commencing from a point spaced from the outer end thereof and ending some distance from the constricted portion 11.

A concentric channel 18 is cut a short distance from the inner end of longer tubular portion 13 and a concentric hole 19 with an inside diameter about equal to that of channel 18 is cut from the inner end of shorter tubular portion 16 to within a short distance of channel 18. Two concentric internal flanges 21 and 22 of substantially equal internal diameters and thicknesses are thus formed in the inner wall of constricted portion 11. A shallow concentric hole 23 with an inside diameter about equal to that of shorter tubular portion 16 is cut into the end of constricted portion 11 from the inner end of tubular portion 16.

A packing ring 24 is disposed in channel 18 and a generally cylindrical seat member 29 containing a packing ring 31 in a concentric inner channel 32 also is disposed concentrically at the inner end of tubular portion 13 and in constricted portion 11 as shown in Figure 1. The outer surface of the plain cylindrical portion 33 of the seat member 29 disposed in constricted portion 11 fits tightly, but slidably, against the inner peripheries of flanges 21 and 22, as shown. The generally cylindrical portion 34 of the seat member 29 disposed in the tubular portion 13 is of larger external diameter than portion 33 and is provided with an external flange 36.

An externally threaded sleeve 37 provided with an internal flange 38 is screwed into the longer tubular portion 13 into engagement with the wall of the constricted portion so that internal flange 38 serves as a limit for the movement of the flange 36 and seat member 29 from the constricted portion 11. A washer 39 provided with an outer peripheral flange 41 tightly fitted around cylindrical portion 34 also is provided with an inner peripheral flange 42 loosely fitted around a pilot tube 43.

The pilot tube 43 is provided with an externally threaded portion 44 and an external flange 46 near the head end thereof and is threaded into an internally threaded adjustment key 47 slidably extending into keyway slot 48 cut through the wall of tubular portion 13. The cylindrical head 49 of the pilot tube is provided with a washer 51 bearing on flange 46 and a recessed drive 52 for a socket wrench. The recessed drive 52 communicates with the bore 53 of the pilot tube 43 through a cylindrical chamber 54 of somewhat larger internal diameter than the drive and the bore as shown. The foot end of the pilot tube 43 is reamed at 56 and is tightly, but slidably, fitted into both cylindrical portions of seat member 29 while surrounded by a helical compression spring 57 under preadjusted compression between washer 39 and key 47. The compression of spring 57 is determined by the position of adjustment key 47 relative to flange 46 on the head of pilot tube 43.

An externally threaded fitting 58 provided with a packing ring 59 disposed in an internal channel 61 is tightly screwed into the outer end of tubular portion 13 to bear against washer 51. The fitting 58 is provided with an internal fitting thread 62 communicating with bore 53 through a chamber 63, drive 52 and chamber 54. The cylindrical walls of chamber 63 in the fitting 58 fit tightly around the head 49 of the pilot tube 43.

A flat seating ring 64 is tightly fitted into hole 23 adjacent the inner end of tubular portion 16. The ring 64 is provided with an inner peripheral seating face 66 adapted to seat a face 67 of spherical curvature on poppet valve 68. Poppet valve 68 is provided with a surrounding conical compression spring 69 and is loosely fitted into the inner end of a fitting 71 tightly screwed into the end of tubular portion 16 to bear against seating ring 64. Fitting 71 is provided with a packing ring 72, disposed in an external channel 73, and an internal fitting thread 74 communicating with bore 53 through passages 76, formed by vanes 77, hole 19, and bore 78 when poppet valve 68 is unseated.

The poppet valve 68 is provided with a surface 79 of spherical curvature adapted to seat against the end of cylindrical portion 33 of seat member 29 as shown in Figure 1.

In operation, hydraulic pressure from the hydraulic system is brought to bear upon the end surface of cylindrical portion 33 of seat member 29 adjacent the spherical face of poppet valve 68. The hydraulic system pressure acts through a conduit (not shown) threaded into fitting 71, passages 76 and hole 19. When the system pressure acting on seat member 29 exceeds the pressure of spring 57 acting thereon in the opposite direction, seat member 29 is unseated from poppet valve 68 by the sliding movement of member 29 through flanges 21 and 22 and along the outside surface of pilot tube 43. Hydraulic fluid then flows through passages 76 and hole 19, past valve 68, and into the relief system through pilot tube 43 and a conduit (not shown) threaded in fitting 58. When the system pressure in hole 19, acting on member 29, equals the pressure of spring 57, acting on member 29, member 29 is again seated on the spherical face 79 of valve 68 to again close the valve.

In the event that the pressure in the relief system acting on poppet valve 68 exceeds the pressure in the hydraulic system plus the pressure of the conical coil spring 69 acting on the valve 68, the valve 68 is unseated by being moved away from seat member 29. Hydraulic fluid then counter flows from the relief system through pilot tube 43, past valve 68, and into the hydraulic system through hole 19 and passages 76. It will be seen that the relief valve can be used as an in-line gage pressure unit.

Poppet valve 68 is provided with faces of spherical curvature at 79 and 67, and is loosely fitted in the inner end of fitting 71 so that the valve can move radially and readily align itself with respect to seat member 29 and the central axis of the valve. During the opening and closing movements of the seat member 29, the packing rings 24 and 31 are frictionally compressed in channels 18 and 31, respectively, and automatically damp the valve action to give rapid and uniform pressure regulation without valve chatter.

In the event that coil spring 57 should fail to apply sufficient pressure to seat member 29 to balance it, the flange 36 will be engaged by internal flange 38 of sleeve 37 and prevent the venting of hydraulic fluid to the atmosphere through the cavity in body 10 and keyway 17.

In the specific embodiment shown in Figure 4 of the drawing, a non-adjustable embodiment of the valve described in connection with Figures 1 to 3 is shown. That is, helical compression spring 57 is not adjustable and is designed or chosen to exert the desired force on poppet valve 68. No key 47 and no keyway 17 are employed in the embodiment shown in Figure 4 because it is designed to be non-adjustable. Also, no internal body thread 12, no threaded sleeve 37 and no flanges 36 and 38 are required to prevent the possible venting of hydraulic fluid into the atmosphere in the event of failure of spring 57 because the valve is designed to be non-adjustable and there is no opening 17 in the body wall. In other respects, the construction and operation of the specific embodiment shown in Figure 4 is similar to that described in connection with Figures 1 to 3. That is, it has poppet valve self-alignment features, automatic damping operation, and counter flow characteristics, as described above.

The foregoing description is explanatory only, and is given primarily to illustrate specific embodiments of my invention. It is understood that many variations in the structure, design and details of the relief valve described above will occur to one skilled in the art. Accordingly, it is understood that such changes and modifications in the structure, design and details of the specific embodiments of my invention illustrated and described above may be made within the scope of the appended claims without departing from the spirit of the invention.

I claim:

1. A relief valve comprising an elongated body, an elongated tube extending into the body and communicating with a fitting in one end thereof, a pressure-responsive valve seat member having uniform bore slidably mounted about the inner end of the tube and communicating therewith, sealing means for preventing escape of fluid to the outside of said tube, a pressure-responsive valve member provided with a surface of spherical curvature and loosely disposed in the body adjacent the seat member for seating and self-alignment therein, a loading spring disposed around the tube for urging the seat member into seating engagement with the valve member, a second loading spring disposed for urging the valve member into seating engagement with the seat member, means limiting longitudinal movement of each of said seat and valve members toward each other, and fitting means in the other end of the body for connecting the valve to a fluid pressure system.

2. A hydraulic relief valve comprising a tubular body, an elongated generally cylindrical tube extending axially into the body and communicating with a fitting in one end thereof, a generally cylindrical pressure-responsive valve seat having a uniform bore slidably mounted about the inner end of the tube for frictionally damped sliding movement on the tube, sealing means for preventing escape of fluid to the outside of said tube, a pressure-responsive valve member provided with a surface of spherical curvature and loosely disposed in the body adjacent the seat member for seating and self-alignment therein, a main spring disposed around the tube for urging the seat member into seating engagement with the valve member in opposition to fluid pressure in one direction, a secondary spring disposed for urging the valve member into seating engagement with the seat member and for counter-flow regulation through the relief valve, means limiting longitudinal movement of each of said seats and valve members toward each other, and fitting means in the other end of the body for connecting the valve to a hydraulic pressure system.

3. A hydraulic relief valve according to claim 2, wherein said main spring is a coil spring and including adjustment means reciprocally mounted on said tube and bearing against one end of said spring for varying the spring pressure load on the seat member.

4. A hydraulic relief valve comprising a cylindrical body, an elongated generally cylindrical tube extending axially into the body and communicating with a fitting in one end thereof, a generally cylindrical pressure-responsive valve seat member slidably mounted about the inner end of the tube for sliding movement on the tube, packing means associated with the seat member for frictionally damping the sliding movement thereof and sealing escape of fluid to the exterior of said tube, stop means for limiting the distance over which the seat member can slide on the tube, a pressure-responsive valve member provided with a surface of spherical curvature and loosely disposed in the body adjacent the seat member for seating and self-alignment therein, a coil spring disposed around the tube for urging the seat member into engagement with the valve member in opposition to fluid pressure in one direction, variable adjustment means for varying the pressure load on the seat member by varying the compression of the coil spring, a second coil spring of less load than the first-mentioned spring disposed around the valve member for urging it into seating engagement with the seat member for counterflow regulation through said relief valve, and fitting means in the other end of the body for connecting the valve to a hydraulic pressure system.

5. A relief valve comprising a valve body, a tube extending into the body and communicating with a fitting in one end thereof, a valve seat member having a bore slidably mounted about the inner end of the tube and communicating therewith and having an exterior, fluid pressure-responsive surface, a valve member disposed in the body adjacent the seat member for seating therewith, sealing means for preventing escape of fluid to the outside of said tube, a spring for urging the seat member into seating engagement with the valve member, a second spring for urging the valve member into seating engagement with the seat member, means limiting longitudinal movement of each of said seat and valve members toward each other, whereby the seat member may be moved away from the valve member by pressure exterior of the seat member and the valve member may be moved away from the seat member by pressure acting solely against the valve member within the seat member.

References Cited in the file of this patent

UNITED STATES PATENTS

| | | |
|---|---|---|
| 2,472,049 | Schneck | May 31, 1949 |
| 2,804,881 | Seid et al. | Sept. 3, 1957 |
| 2,841,171 | Baker et al. | July 1, 1958 |